April 30, 1935.  W. MUELLER  1,999,514
REGENERATIVE COKE OVEN
Filed Nov. 1, 1929   6 Sheets-Sheet 4
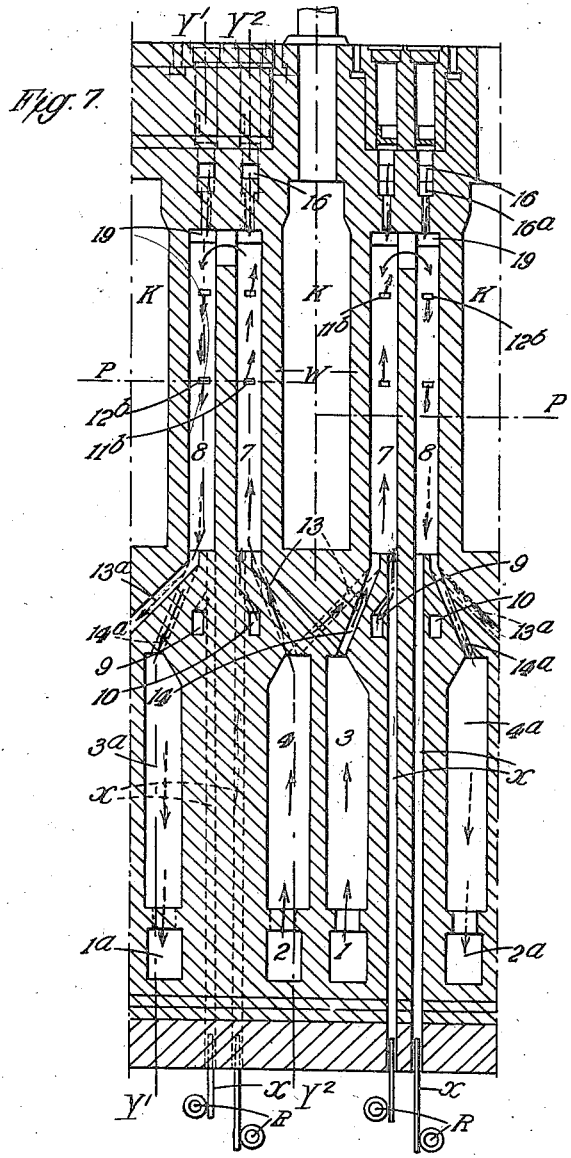
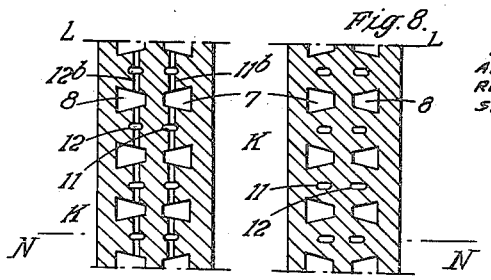
FLOW INDICATION ARROWS.
AIR AND WEAK GAS ⟶
RICH GAS ⟶
SPENT GASES ⟶
INVENTOR.
W. MUELLER
By Fetherstonhaugh Co.
ATTYS.

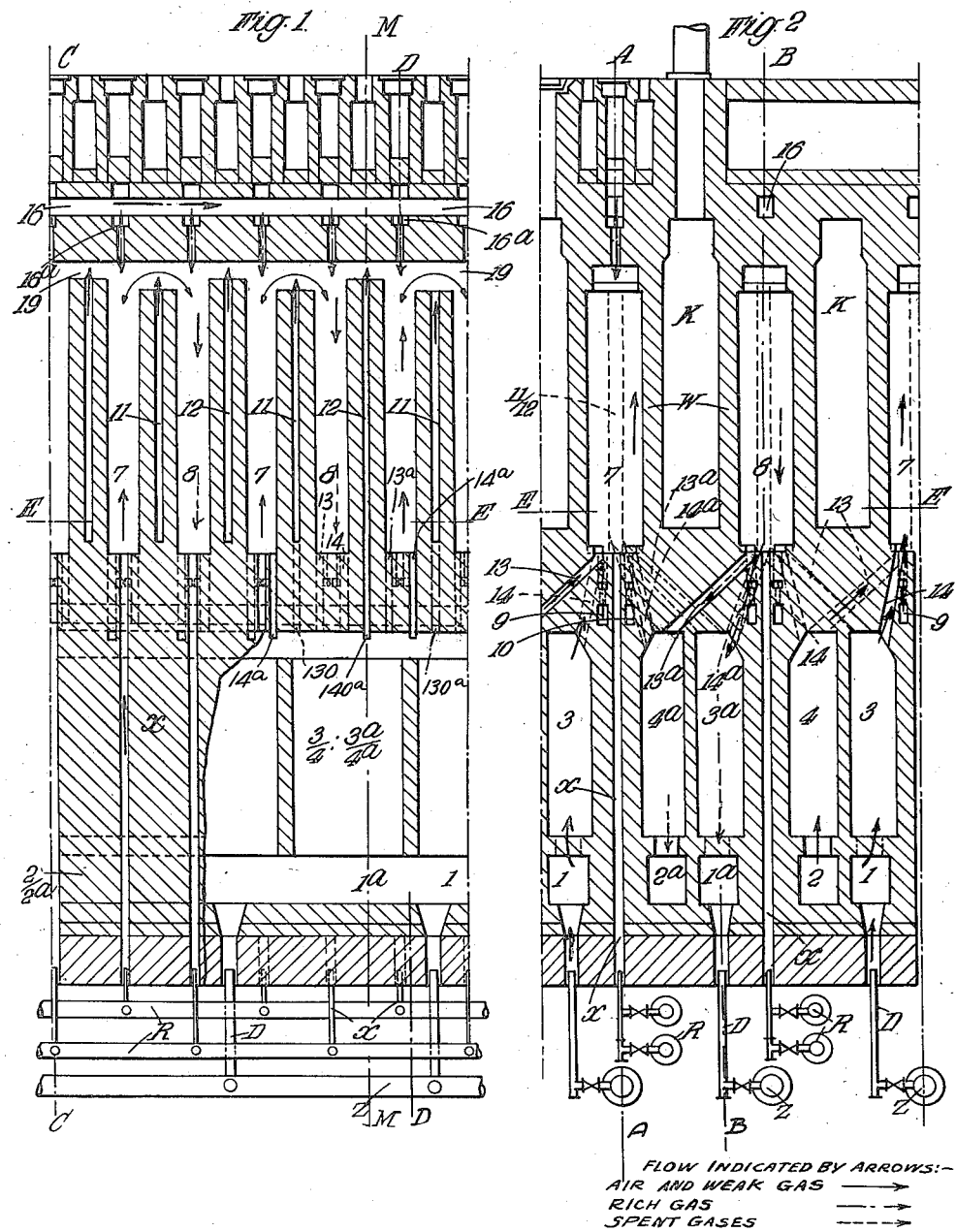

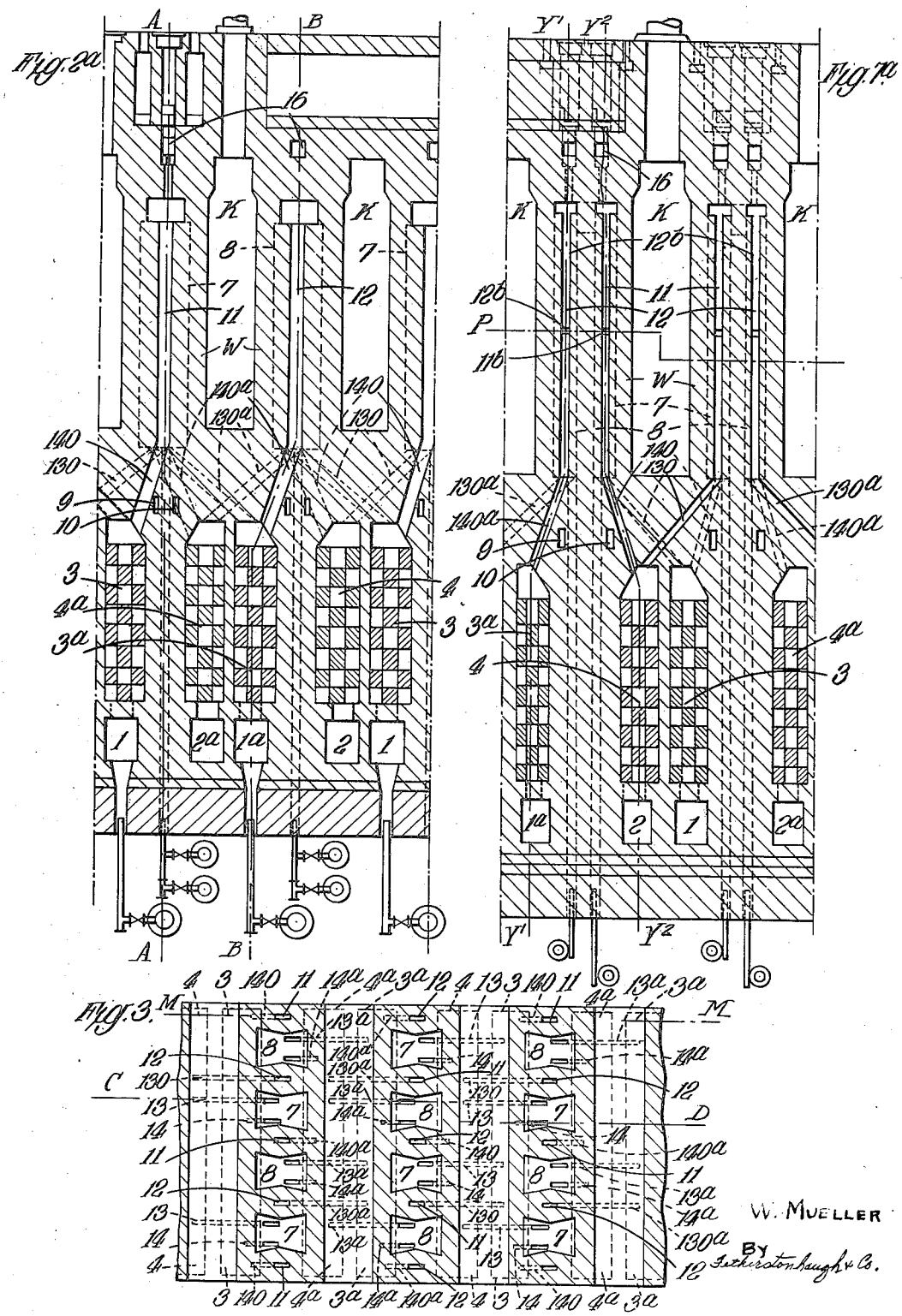

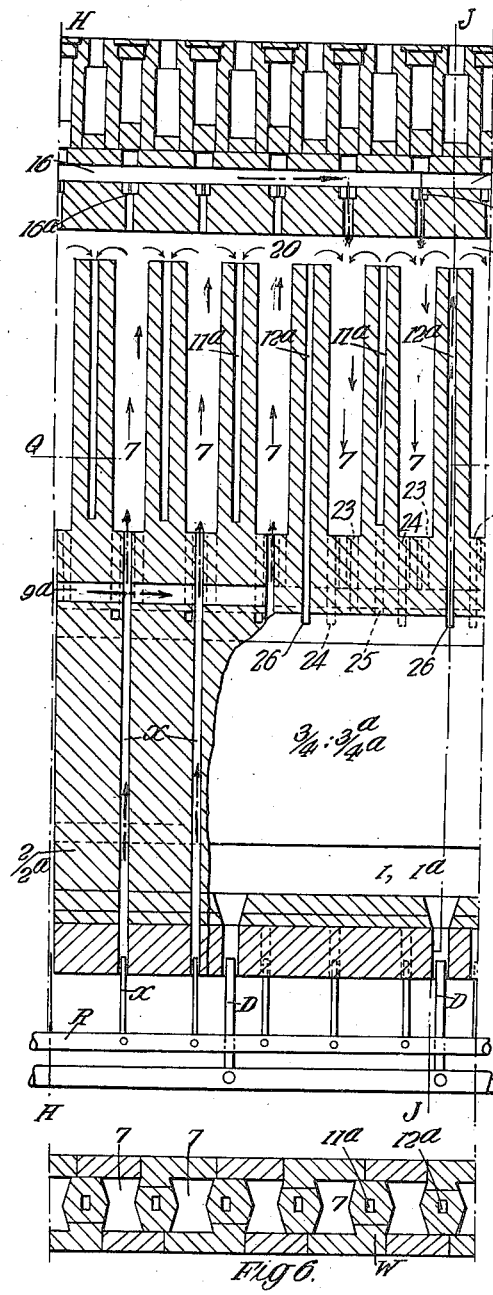
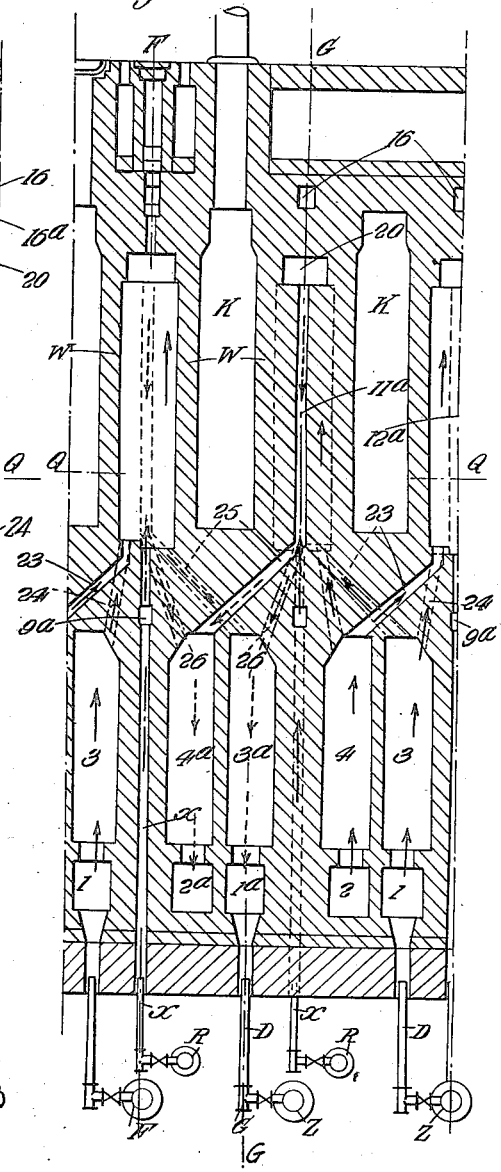

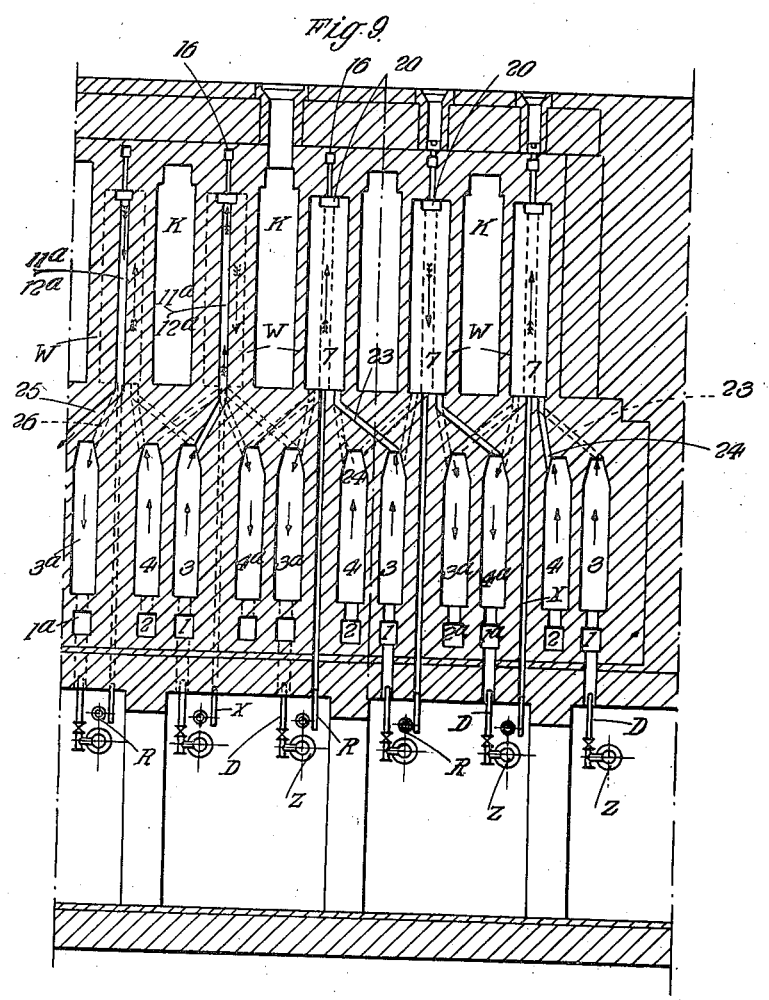

Patented Apr. 30, 1935

1,999,514

UNITED STATES PATENT OFFICE 1,999,514

REGENERATIVE COKE OVEN

Wilhelm Mueller, Gleiwitz, Germany

Application November 1, 1929, Serial No. 404,109
In Great Britain November 3, 1928

3 Claims. (Cl. 202—142)

This invention refers to improvements in or relating to regenerative coke ovens.

In the coke ovens described in British Patent No. 308,994 the chamber walls are connected at the lower ends to serially disposed regenerator compartments for heating the gas and air under each oven chamber.

The purpose of the present invention is to connect the twin heating flues or single heating flues directly with, in each case, one of a number of adjacently disposed gas and air regenerators, situated underneath each oven chamber and extending the whole length thereof, thus establishing a good balance between the heating medium and the exhaust heat, with the result that a maximum uniform heating of the walls is obtained.

In the drawings:—

Fig. 1 is a longitudinal section through the ovens along the lines A—A, B—B of Figs. 2 and 2a.

Fig. 2 is a cross section along the lines C—C and D—D of Fig. 1 and C—D of Fig. 3.

Fig. 2a is a cross section along the line M—M of Figs. 1 and 3.

Fig. 3 is a horizontal section through the heating wall along the line E—E of Figs. 1 and 2.

Fig. 4 is a longitudinal section through a modified form of oven along the lines F—F, G—G of Fig. 5.

Fig. 5 is a cross section along the lines H—H and J—J of Fig. 4.

Fig. 6 is a horizontal section of a portion of a heating wall taken along the line Q—Q of Figs. 4 and 5.

Fig. 7 is a cross section through another form of oven with transversely disposed twin flues or double rows of heating flues in each wall, the section being taken along the line L—L of Fig. 8.

Fig. 7a is a cross section similar to Fig. 7 but taken along the line N—N of Fig. 8.

Fig. 8 is a horizontal section taken along the line P—P of Fig. 7.

Fig. 9 is a sectional view of an oven battery as shown in Figs. 4 to 6, the section being taken perpendicular to the length of the oven chambers and heating walls, and Fig. 10 is a cross section longitudinal of the heating walls taken along the lines $Y^1$—$Y^1$ and $Y^2$—$Y^2$ of Figs. 7 and 7a.

Figure 10:
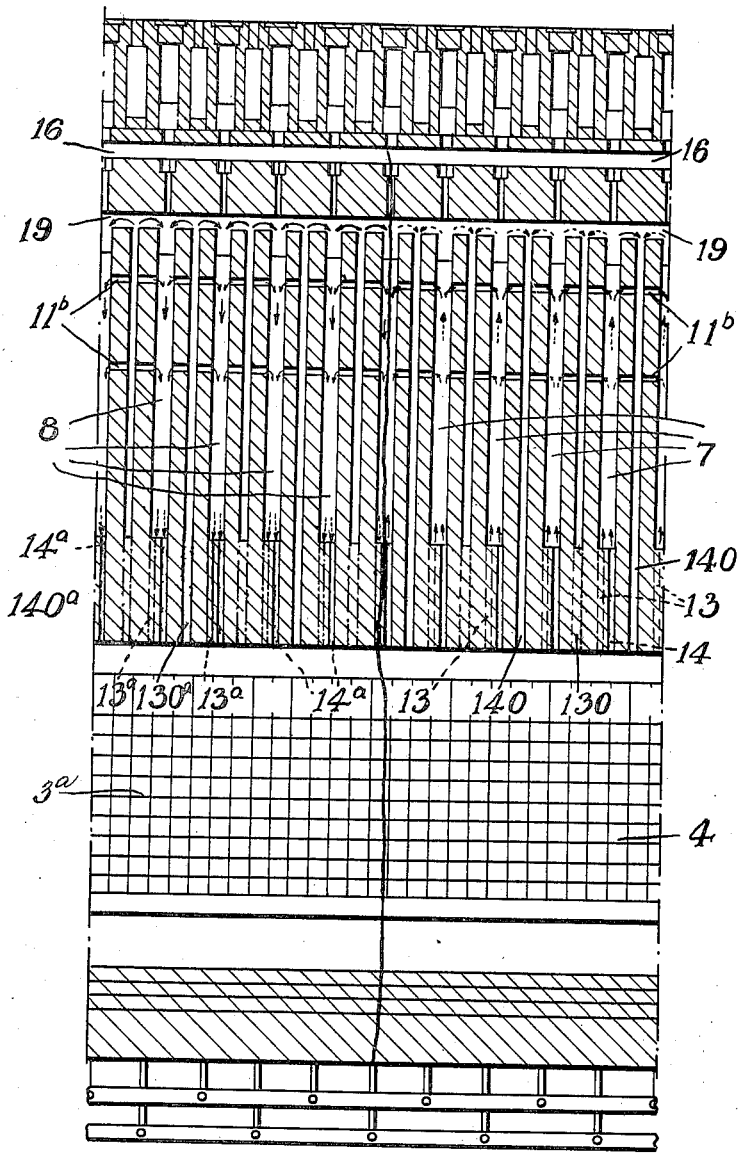

As shown in Figs. 1, 2, 2a and 3, the heating walls W situated between the oven chambers K, are divided into pairs of twin heating flues 7 and 8, each of which according to this invention, is connected at its lower end by means of openings 13 or 14, with gas or air-regenerators 3 or 4, or $3^a$ or $4^a$. A portion of the hot gas and air can be led upwards, through the passages 11 and 12 in the brickwork, to supplement the heating flames for the downcast flames. The lower ends of passages 11, 12 are for this purpose connected by means of passages 130, 140, $130^a$, $140^a$ with the regenerators 4, 3, or $4^a$, $3^a$, as shown in Figs. 2a and 3, each passage 11, 12 being connected with one regenerator only so that the preheated air and gas are not brought into mutual contact till they emerge at the upper ends of passages 11, 12. Each of said regenerators is connected below with the gas and air-supply passage 1 or 2, or $1^a$ or $2^a$, which are connected at the one side, to the gas and air valves, and on the other to the exhaust-heat valves and the exhaust flue leading to the chimney.

In the ovens shown in Figs. 4 and 5, each single heating flue 7 is connected at the lower end by a passage 23 and a passage 24, to the regenerators 3 and 4, whilst the passages $11^a$ and $12^a$ in the brickwork are connected, through the oblique passages 25 and 26, with the regenerators $3^a$ or $4^a$ of the adjacent chamber.

In operating the ovens according to Figs. 1 and 2, the poor gas is admitted into the passage 1 either through the pipes Z and nozzles D, from below or from the side, and the air is admitted into the passages 2, where they are both distributed, throughout the whole length of the oven, in the regenerators 3 and 4 and become strongly heated by the hot chequerwork. The hot gas and air ascend thence, through openings 13 and 14, into the heating flues 7, where the two media ascend in a burning condition and are then deflected downwards into the adjacent heating flues 8.

In order to increase the heat in the heating flues, with downwardly directed flame for the time being, a portion of the hot gas and air from the regenerators is led upwards through passages 11 or 12 in the brickwork, to the reversing points of the twin heating flues, so as to burn conjointly with the descending flames. At the lower end of the heating flues 8, the exhaust gases then pass through the similar openings $13^a$ and $14^a$ under the adjacent ovens to the regenerators $3^a$ or $4^a$, where they part with their heat to the chequerwork, and escape through the passages $1^a$ or $2^a$ to the exhaust flue and chimney and into the open air.

After the usual reversal of the gas, air and exhaust valves, at half-hour intervals, the gas and air now pass through the passages $1^a$ and $2^a$ through the regenerators $3^a$ and $4^a$, and the openings 13ª and 14ª, to the heating flues 8, where they ascend in a burning condition, and, at the reversing points, receive additional fresh gas and air, whereupon they descend through the heating flues 7 and the openings 13 and 14 into the regenerators 3 and 4, and pass off through the passages 1 and 3 to the exhaust flue and chimney.

The oven according to Figures 7, 7a and 8 operates in the same way as in Figs. 1 and 2 but in this case the heating flames pass into the double-row heating flues of the walls—upwardly through all the flues 7 on the one side—and are then diverted downwards at the reversing points at the top, into all the heating flues 8 on the other side, and vice versa.

Supplementary horizontal passages 11ᵇ and 12ᵇ are provided between the vertical passages 11 and 12 and the heating flues 7 and 8, Figs. 7 and 8, in order to secure air and gas admission at different levels.

The passages 11, 12 are connected in the manner shown in Figure 7a with the regenerators 3, 4 or 3ª, 4ª by means of passages 130, 140, 130ª, 140ª each passage 11 or 12 being connected with one regenerator only, so that the preheated air and gas are not brought into mutual contact till they emerge into the passages 11ᵇ or 12ᵇ.

The ovens according to Figs. 4 and 5, operate in almost the same manner as described above, but with the difference that each single heating flue is heated alternately from below or above, with fresh flames, namely in the following manner.

The poor gas is introduced through the passage 1, the air through the passage 2, to the regenerators 3 or 4, over the whole length of the oven; and they pass thence, through the openings 23 or 24, into each single heating flue 7, where they unite and ascend in a burning condition. At the top, the flames from the passage 20 then descend through the passages 11ª or 12ª in the brickwork and through the openings 25 and 26 to the regenerators 3ª and 4ª, whence they flow through the passages 1ª or 2ª into the open air by way of the exhaust flue and chimney. After the usual reversal of the gas, air and exhaust valves, the gas and air flow through the passages 1ª and 2ª, the regenerators 3ª and 4ª, the openings 25 and 26, the passages 11ª and 12ª in the brickwork, and then pass from the top passage 20 into each single heating flue, which they descend in a burning condition, passing through the openings 23 and 24 into the regenerators 3 and 4; and the exhaust heat escapes thence through the passages 1 and 2 into the chimney.

In operating the ovens with rich gas alone, the pipes supplying the poor gas are shut off, so that both regenerators operate alternately, solely for preheating the air or drawing off the exhaust heat.

In Figs. 1 and 2, and Figs. 7 and 8 the rich gas is admitted into the heating flues from below, either through the horizontal passages 9 and 10, or from the pipes R by way of the nozzles X; whereas, on the other hand, the upper supply of gas is effected through the passage 16 corresponding nozzles 16ª being provided for each heating flue.

In the ovens according to Figs. 4 and 5, the rich gas can also be supplied to the single heating flues from below through a horizontal passage 9ª, or through nozzles X from a lower pipe R; whereas the upper supply of gas is admitted from above into each of the heating flues, through the passage 16 and suitably calibrated stone nozzles 16ª.

As shown in Fig. 9 the present invention embodies a further improvement in the heating of the coking chamber walls in a group or battery of coke ovens in so far, that the oven walls according to Figs. 4 and 5 can be heated with fresh flames the full length of the ovens in all heating flues alternately in the one wall from below upwardly and in the next wall from above downwardly and so forth. In the same manner, the gas and air in the regenerators 3 and 4 which are connected to the heating flues Z, have alternately an upward direction of flow under the one oven, and a downward drection of flow of the waste heat in the regenerators 3ª and 4ª under the next oven chamber.

This method of heating the coking chamber alternately in the one wall with fresh flames in all flues Z upwards and at the same time in the neighbour wall with fresh flames in all flues Z downwards, results in a great improvement in the equal distribution of the heat over the full height and length of the oven and ensures a shorter coking time and better, uniform coke, gas and by-products. Contrary to the methods up to now in use i. e. heating a part of the oven flues from below with fresh flames only and heating the other part of flues with the waste heat flames of the former, but not with fresh live flames.

The technical advantage furnished by the invention consists in that the pairs of twin heating flues, or each single heating flue of the chamber walls can be operated, the full length of the oven, with uniformly distributed hot gas and hot air, the result being, in addition to simplified construction, a uniformly strong heat throughout the length and height of the oven wall, and consequently more rapid coking and better coke and by-products. Also, in operating the ovens with rich gas, a substantial advantage is secured in that the oven walls are operated, all the way along, with uniformly distributed air and exhaust heat, so that the combustion flames generate a perfectly uniform heat in all the heating flues.

What I claim is:—

1. A regenerative coke-oven or gas-retort furnace including a series of alternate horizontally elongated coking-chambers and heating walls therefor arranged side by side in a row, each of said heating walls having arranged therein at least one row of vertical heating flues, a series of horizontally elongated regenerators arranged below and parallel with the series of coking-chambers, each coking chamber being located above a pair of contiguous regenerators, valve means for admitting air to all the regenerators and weak gas to one regenerator of every pair, and for exhausting waste gases from all the regenerators, said valve means being operable for enabling alternate pairs of regenerators to function as admission and exhaust regenerators respectively and for reversing the functions of the regenerators, together with means for supplying fresh flames to and exhausting waste gases from each heating flue at the top and bottom thereof alternately, that is in such wise that on reversal of flow through the regenerators the direction of flow in each heating flue is reversed, said last named means including at least one row of vertical ducts arranged in each heating wall in the intervals between the heating flues, together with means interconnecting the upper end of each of said ducts with the upper ends of the heating flues adjacent thereto, and two sets of substantially straight inclined transfer passages issuing from the regenerators and partly crossing over one another, the transfer passages of the one set leading directly and independently into the lower end of each of the heating flues and the transfer passages of the second set being each prolonged by one of said vertical ducts for connecting the regenerators with upper ends of the heating flues.

2. A regenerative coke-oven or gas-retort furnace including a series of alternate horizontally elongated coking chambers and heating walls therefor arranged side by side in a row, a series of horizontally elongated paired regenerators, each of the members of each pair of regenerators being contiguous to the other member of the pair and arranged directly below and parallel with a coking chamber, at least one row of vertical heating flues arranged in each heating wall, at least one row of vertical ducts in each heating wall, said ducts being arranged in the intervals between adjacent heating flues, means interconnecting the upper end of each of said ducts with the upper ends of the heating flues adjacent thereto, substantially straight inclined ducts directly connecting the lower end of each heating flue with both regenerators of a pair underlying a coking-chamber adjacent said last named heating flue; and other substantially straight inclined ducts each forming a downward prolongation of one of said vertical ducts for communication directly with one of the regenerators of a pair underlying a coking-chamber adjacent said last named vertical duct; the inclined ducts connecting any pair of regenerators with the heating flues and vertical ducts of the heating walls adjacent said pair of regenerators on either side being arranged partly to cross over one another; together with reversible valve means for admitting air and gas to and exhausting waste gases from alternate pairs of regenerators.

3. A regenerative coke oven or a gas retort furnace comprising a series of alternate horizontally elongated coking chambers and heating walls therefor arranged side by side in a row, each of said heating walls having a single row of vertical flues and a series of vertical ducts, at least one such duct being arranged in each of the intervals between adjacent flues of a row and a horizontal passageway interconnecting the upper ends of said flues and ducts, a series of horizontally elongated regenerators arranged below and parallel with the series of coking chambers, each coking chamber being arranged above a pair of contiguous regenerators, valve means for admitting air to all regenerators and weak gas to one regenerator of each pair, and for exhausting waste products from all regenerators, said valve means being operable for enabling alternate pairs of regenerators to function as admission and exhaust regenerators respectively and for reversing the functions of the regenerators, together with substantially straight transfer passages connecting the regenerators with the lower ends of the flues and vertical ducts, said transfer passages being so arranged that the flues of the same heating wall are connected alternately with the regenerator pairs on opposite sides of said heating wall, each flue being directly and independently connected with both regenerators of a pair, while the vertical ducts in the same heating wall are connected in alternate pairs with the regenerator pairs on opposite sides of said heating wall, each vertical duct being directly and independently connected with one member of a regenerator pair only.

WILHELM MUELLER.